Patented Feb. 21, 1939

2,148,127

UNITED STATES PATENT OFFICE 2,148,127

COMPOSITION OF MATTER USEFUL FOR INSULATING AND OTHER PURPOSES

Brouwer D. McIntyre, Monroe, Mich., assignor to Insulation Development Corporation, Monroe, Mich., a corporation of Michigan No Drawing. Application March 18, 1935, Serial No. 11,737, 4 Claims. (Cl. 106—23)

This invention relates to a composition of matter useful for insulating and other purposes.

This application is a continuation in part of my application Serial No. 670,042, filed May 8, 1933.

The invention has as one of its primary objects to produce a material having highly efficient insulating properties and having a consistency and other characteristics which enables the material to be applied by spraying the same onto the surface to be coated.

Another object of the invention is to provide a material having the same desirable insulating characteristics which may be molded or otherwise formed into sheets, blocks, slabs or the like suitable for use in insulating, for instance, the dash boards of motor vehicles, the walls of refrigerators, and in other places where the particular insulating characteristics of this material renders its use advantageous.

One of the uses for my improved insulating material is in the insulating of automobile bodies and the like to reduce the rumble and vibration of the same. In its application to automobile bodies, my improved insulating material is formed with a consistency suitable for spraying onto the inside of the automobile body and thus provides means for adequately insulating the body throughout even at places where sharp angles and inaccessibility rendered the application of sheet insulating material commercially impractical. This material may also be applied, for instance, on the exposed metal parts on the underside of automobiles, and when thus used acts to reduce road noise and to prevent stone bruises on fenders and other sheet metal parts.

My improved composition of matter consists principally of an adhesive vehicle and a body material having insulating characteristics. The insulating material consists of vermiculite ground to the desired size and expanded by the use of heat to several times the size of the original crude particles. The adhesive material employed may be asphalt or some other bituminous material; or resin; or casein glue, or a combination of any two or more of these combined with water. A plasticizing agent in the form of normal latex or chemical vulcanized latex may be and is preferably added to give elasticity to the material. In some instances ground rubber has been successfully used.

In preparing the mixture when the same is to be sprayed onto the surface to be coated, the vermiculite particles are preferably of a size known as minus 28 plus 60 crude expanded before mixing. In other words, the crude material is of a size that will pass through a 28 mesh screen and will be retained on a 60 mesh screen. After expansion, naturally these sizes will be considerably larger. When the composition of matter is to be molded into sheets, blocks, slabs, or the like, a coarser grade of vermiculite particles is preferable.

Expanded vermiculite provides a very efficient insulation against heat and cold and has excellent sound and vibration deadening qualities. It has a high fusing point, fusing at about 2462° F. It constitutes a good dielectric substance and is of a non-hygroscopic nature.

The use of an adhesive vehicle consisting of a solution of water and casein glue; or a solvent solution of asphalt or other bituminous material; or a solvent solution of resin; or a combination of two or more of these materials, together with the use of a plasticizing agent, such as normal latex or chemical vulcanized latex, contributes certain definite advantages to this composition of matter. The resulting mixture is waterproof and when sprayed or otherwise applied will adhere to such smooth surfaces as steel, or any other surface to be insulated or coated. Due to the rubber content, the mixture is rendered sufficiently flexible to prevent the same from becoming loosened by vibration or jars.

In preparing one form of my improved composition of matter the following formula has been successfully employed:

| | Parts |
|---|---|
| Casein glue | 5 |
| Water | 20 |
| Latex (60% solids) | 8 |
| Additional water | 18 |
| Vermiculite particles | 20 |

In preparing the mixture, the dry glue is mixed into the water thoroughly and allowed to soak for a few minutes. The latex is then added and the mixture is thoroughly stirred. The additional water is then added and the vermiculite particles are introduced into the mixture and the whole is again stirred until the vermiculite particles are thoroughly covered with the binder. The preparation is then ready for use.

I have also found that ground rubber can be successfully introduced into the mixture as well as latex and in preparing my combination of matter the following formula has been successfully employed:

| | Parts |
|---|---|
| Glue | 5 |
| Water | 20 |
| Latex (60% solids) | 8 |
| Additional water | 18 |
| Vermiculite | 10 |
| Ground rubber | 10 |

It is obvious that the exact relative proportions hereinbefore given of the several constituents of the mixtures may be varied without materially changing the characteristics of the product. For instance, if the percentage of solids in the latex constituent is less, the water constituent may be varied accordingly.

When a bituminous material is to be employed as an adhesive the following formula has been successfully employed:

| | Parts |
|---|---|
| Solvent solution of asphalt or bituminous material | 20 |
| Normal latex or vulcanized latex | 2 |
| Water | 10 |
| Expanded vermiculite | 10 to 15 |

The use of an adhesive vehicle including bituminous material and resin has also been found successful. When these materials are employed as the adhesive vehicle, the following formula may be followed:

| | Parts |
|---|---|
| Solvent solution of bituminous material | 10 |
| Solvent solution of resin | 10 |
| Normal latex · vulcanized latex | 2 |
| Water | 10 |
| Expanded vermiculite | 10 to 15 |

If desired, the adhesive vehicle may comprise emulsified bituminous material, and in this instance the following formula may be followed:

| | Parts |
|---|---|
| Emulsified bituminous material | 20 |
| Normal latex or vulcanized latex | 2 |
| Water | 10 |
| Expanded vermiculite | 10 to 15 |

As has been heretofore mentioned, the exact proportions given in the preceding formulae may obviously be varied without materially changing the characteristics of the product. If the plasticizing agent is deemed unnecessary, the latex content may be omitted.

In the examples given herein, a non-curing rubber cement may be substituted for latex.

Any of the mixtures of substantially the proportions hereinbefore given have a consistency suitable for application by spraying and thus may be used to great advantage in insulating the interiors of automobile bodies and the like, as has been hereinbefore pointed out. When employed as a spray-on insulating material for automobile bodies, the material has several important advantages. For instance, the material has superior sound and vibration deadening qualities. It is waterproof; it is not affected by atmospheric temperature changes, and is strongly adhesive to smooth surfaces such as steel and the like. As has been pointed out, the mixture may be applied by spraying and will not support combustion. Moreover, the weight of the material when applied in sufficient amount to adequately insulate an automobile body is much less than that of any of the well-known types of insulating materials used for the same purpose. The material is odorless when dry and it can be applied without fear of its permeating through the upholstering material to discolor or injure the latter.

By using any of the formulae hereinbefore set forth but substituting a coarser grade of vermiculite particles, the material may be molded or otherwise formed into sheets, blocks, slabs or the like. If molded, the material is poured into a mold and allowed to set or harden in the presence of sufficient heat to evaporate the moisture. Thus the material may be made in the form of a slab or sheet suitable for insulating the dash of a motor vehicle, the sheet or slab being cemented, bolted or otherwise fastened to the motor vehicle dash either on the inside or outside thereof.

Blocks or slabs of this material may be used to particular advantage as an insulating medium for the walls of refrigerators and the like, particularly in view of the high non-hygroscopic nature of the material.

I have also found that a coating of this material sprayed or troweled onto walls or ceilings will have very definite sound absorbing characteristics and also great resistance to the transfer of heat or cold through the wall or ceiling.

This combination of matter, when the finer particles of vermiculite are used, may be successfully employed as a coating for fabrics to add to the stiffness or rigidity of such fabrics when the latter are used as door panel coverings, top material, or head linings in motor vehicles and the like. The material may also be used as a backing for floor carpets where it acts both as a binder for the short threads or hairs which form the pile, and as an insulator against heat and noise. It can also be used to advantage in the construction of solid type roofs to give structural strength and insulate the same against noise and drumming.

This composition of matter may also be used to advantage in many other ways not at present known and as a consequence not herein specifically enumerated.

What I claim as my invention is:

1. A composition of matter of the character described including casein glue, latex, and expanded particles of vermiculite.

2. An insulating material formed of expanded particles of vermiculite, casein glue and latex, and sufficient water to provide a consistency suitable for application by spraying.

3. A composition of matter of the class described comprising substantially five parts of casein glue, eight parts of sixty percent solid latex, twenty parts of expanded particles of vermiculite, and thirty-eight parts of water.

4. An insulating material of the character described comprising an adhesive agent of sufficient quantity to permit the material to adhere to a surface and selected from the group consisting of resin, casein glue, asphalt, and bituminous substitutes for asphalt, a plasticizing agent of sufficient quantity to impart elasticity to the material and selected from the group consisting of latex, rubber and substitutes for rubber, and expanded particles of vermiculite.

BROUWER D. McINTYRE.